(12) United States Patent
Gamble

(10) Patent No.: US 7,003,281 B1
(45) Date of Patent: Feb. 21, 2006

(54) METHOD AND SYSTEM FOR ROUTING CELLULAR CALLS TO DESIRED DISCOUNT TELEPHONE SERVICES

(76) Inventor: Oliver Wendel Gamble, 436 E. 75th St., New York, NY (US) 10021

( * ) Notice: Subject to any disclaimer, the term of this patent is extended or adjusted under 35 U.S.C. 154(b) by 555 days.

(21) Appl. No.: 09/901,600

(22) Filed: Jul. 11, 2001

Related U.S. Application Data

(60) Provisional application No. 60/217,018, filed on Jul. 11, 2000.

(51) Int. Cl.
*H04M 11/00* (2006.01)
(52) U.S. Cl. ............... 455/407; 455/417; 379/221.02; 379/221.14
(58) Field of Classification Search ............... 455/405, 455/406, 408, 414.1, 445, 450, 460, 564, 455/565; 379/130, 137, 114.01–114.03, 379/114.23–114.26, 221.02, 221.14
See application file for complete search history.

(56) References Cited

U.S. PATENT DOCUMENTS

| | | | |
|---|---|---|---|
| 4,506,116 A | 3/1985 | Genest | |
| 5,583,933 A | 12/1996 | Mark | |
| 5,638,433 A * | 6/1997 | Bubien et al. | 379/130 |
| 5,668,955 A * | 9/1997 | deCiutiis et al. | 379/130 |
| 5,732,133 A | 3/1998 | Mark | |
| 5,774,533 A * | 6/1998 | Patel | 379/127.03 |
| 5,799,071 A * | 8/1998 | Azar et al. | 379/114.02 |
| 5,809,126 A | 9/1998 | Smith et al. | |
| 5,818,930 A | 10/1998 | Mark | |
| 6,006,085 A * | 12/1999 | Balachandran | 455/406 |
| 6,078,805 A * | 6/2000 | Scott | 455/406 |
| 6,134,609 A * | 10/2000 | Klein | 710/52 |
| 6,208,719 B1 * | 3/2001 | Lo et al. | 379/114.03 |
| 6,650,887 B1 * | 11/2003 | McGregor et al. | 455/406 |
| 6,661,890 B1 * | 12/2003 | Ellis | 379/355.01 |

* cited by examiner

*Primary Examiner*—Joy K. Contee

(57) ABSTRACT

A method and system for automatically completing international telephone calls using a pre-selected discount telephone service. An array of Pic I/O pin used to monitor a cell phone activity. When the dialing of an outgoing call is detected, a central processing unit, in conjunction with a DTMF decoder, determines whether the call being made is a discount call by detecting whether predetermined positioned digit(s) is a predetermined number or set of numbers. If the number dialed is a potential discount call, the DTMF generator dials a predetermined discount service provider number and/or access code resulting in completion of the call at a discounted rate.

45 Claims, 5 Drawing Sheets

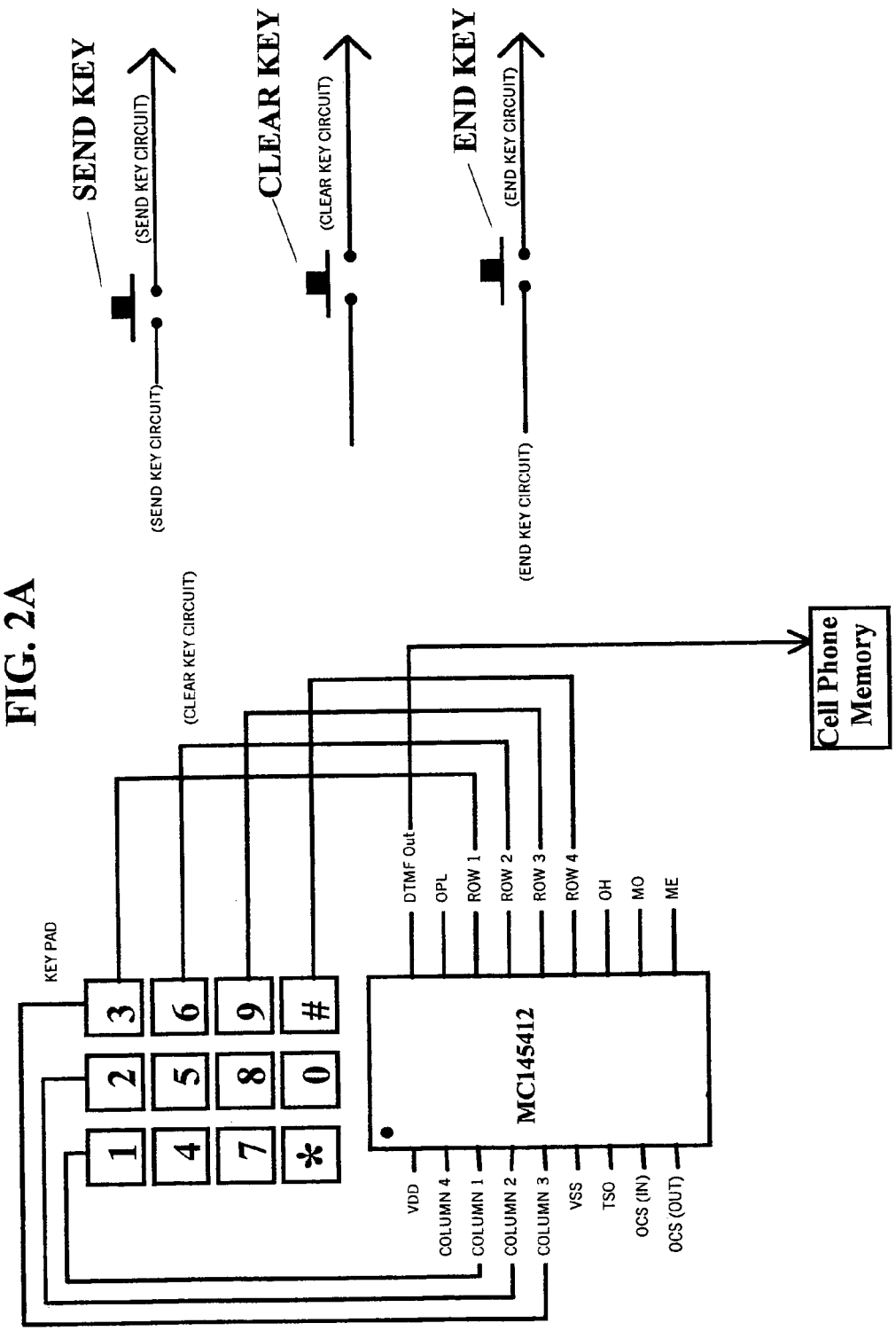

METHOD AND SYSTEM FOR ROUTING CELLULAR CALLS TO DESIRED DISCOUNT TELEPHONE SERVICES

I claim the priority of provisional patent application 60/217,018 filed on Jul. 11, 2000; this application is incorporated by reference in it entirely.

FIELD OF THE INVENTION

The present invention relates generally to a method and system for completing cellular phone calls over a network and more particularly to a method and system for completing such calls using a pre-selected discount service.

BACKGROUND OF THE INVENTION

Because telephone service is largely a commodity, consumers often select a calling plan that will result in the least expensive bill at the end of each payment period. As a result, many telephone companies attract and/or maintain its customers by offering a variety of service plans. The plan offerings are usually in the form of per minute rates (sometimes with a monthly fee) and may vary based on other factors, such as the time of day that the call is placed, the length of the individual telephone call, the total amount of time associated with the user's outgoing calls, etc. Customers usually try to get the service that best suits their needs at the lowest rate.

In addition to these basic telephone service plans, many companies offer its customers a service called "dial around." Dial around are prefixes (such as "10-10-321" or "10-10-345") that telephone users may dial which enable them to bypass (or dial around) their pre-selected long distance carrier. Technically, the prefix serves as a "carrier access code" that enables local telephone carriers to identify and reroute calls to other long distance telephone companies. The dial-around service charges may appear on the telephone bill provided by the local Telephone Company, just as the charges for the pre-selected long-distance carrier are reported. In addition to the dial around services described above, discounted long distance services can also have the form of a user dialing a 800 telephone number, entering an access code, and then the desired phone number.

Although telephone users desire to take advantage of these discounts, the large number of options available to these consumers makes choosing such a service confusing. Moreover, many consumers often refrain from using such services because most of these discount services require the user to remember and enter a complex multi-digit code (in addition to the actual area code and recipient telephone number) to place a telephone call. For example, completing a long distance telephone call utilizing one of the existing Internet telephone company services often requires that an access telephone number and user identifier be dialed prior to dialing the intended telephone number. Thus, eighteen to thirty numbers or more may be required to complete a discounted long distance telephone number. Consumers' inability or indifference to remember such prefixes or access telephone numbers results in decrease usage of such services.

In addition to the difficulty in remembering such prefixes and/or access numbers, telephone users often wish to spare themselves of other disadvantages associated with using such services. For example, a telephone user has a greater chance of dialing an incorrect number when as many as twenty plus digit phone number. Also, the speed in which a caller is connected to the recipient is reduced when these additional numbers must be entered. Finally, some consumers are embarrassed to use, or to request that other users of their telephone use, such discount service, particularly in light of the hindrances discussed above.

SUMMARY OF THE INVENTION

Accordingly, an improved system and method are required which will allow telephone users to take advantage of the discounted services available when making international calls while avoiding the disadvantages discussed above. The method and system of the invention satisfies that problem. According to one embodiment, the invention enables consumers to take advantage of one or more of the available discount services when making international phone calls while not having to remember or enter the additional digits typically required to effectuate such calls. Moreover, the speed and accuracy in making such calls are likewise not affected.

This is accomplished by utilizing a device that automatically re-routes entered international phone calls to a pre-selected discount long distance service provider. This re-routing device shall be known as a Router. A Router works off of a C.S.X. (monitored I/O pins of the Pic) sensor array that monitors the cell phone user activity. The sensor array consists of specific Pic I/O pins that are monitored for a high state. When the user of the cell phone presses a Key that is connected to one of these monitored pin a Router can tell what the user is trying to do. When the user of the cell phone is entering a phone number, a Pic, in conjunction with a DTMF (Dual Tone Multi-Frequency) transceiver, determines whether the call being made is international by detecting whether a predetermined positioned digit(s) is a predetermined number or series of numbers. If the user is entering an international phone number, the central processing unit will effectuate a discount rate by dialing the discount carrier service, entering any required access code, and then dialing the user entered phone number.

BRIEF DESCRIPTION OF THE DRAWINGS

FIG. 2A illustrates the normal circuit for the function key in a cell phone.

In FIG. 2B a Pic 124 is employed by router 120 and comprises a Pic micro-controller chip (microprocessor), Pic Basic (software language use to program the micro-controller), EEPROM (electrically erasable programmable read only memory), RAM (Random Access Memory) and ports through which information and instructions can be passed. A port consist of a group of pins that can detect or generate high and low states (electrical signals). In this embodiment the pins of these ports are referred to as I/O pins (pins), and each pin may itself be in or detect a high or low state.

DETAILED DESCRIPTION

System Of The Invention

Figure 1:
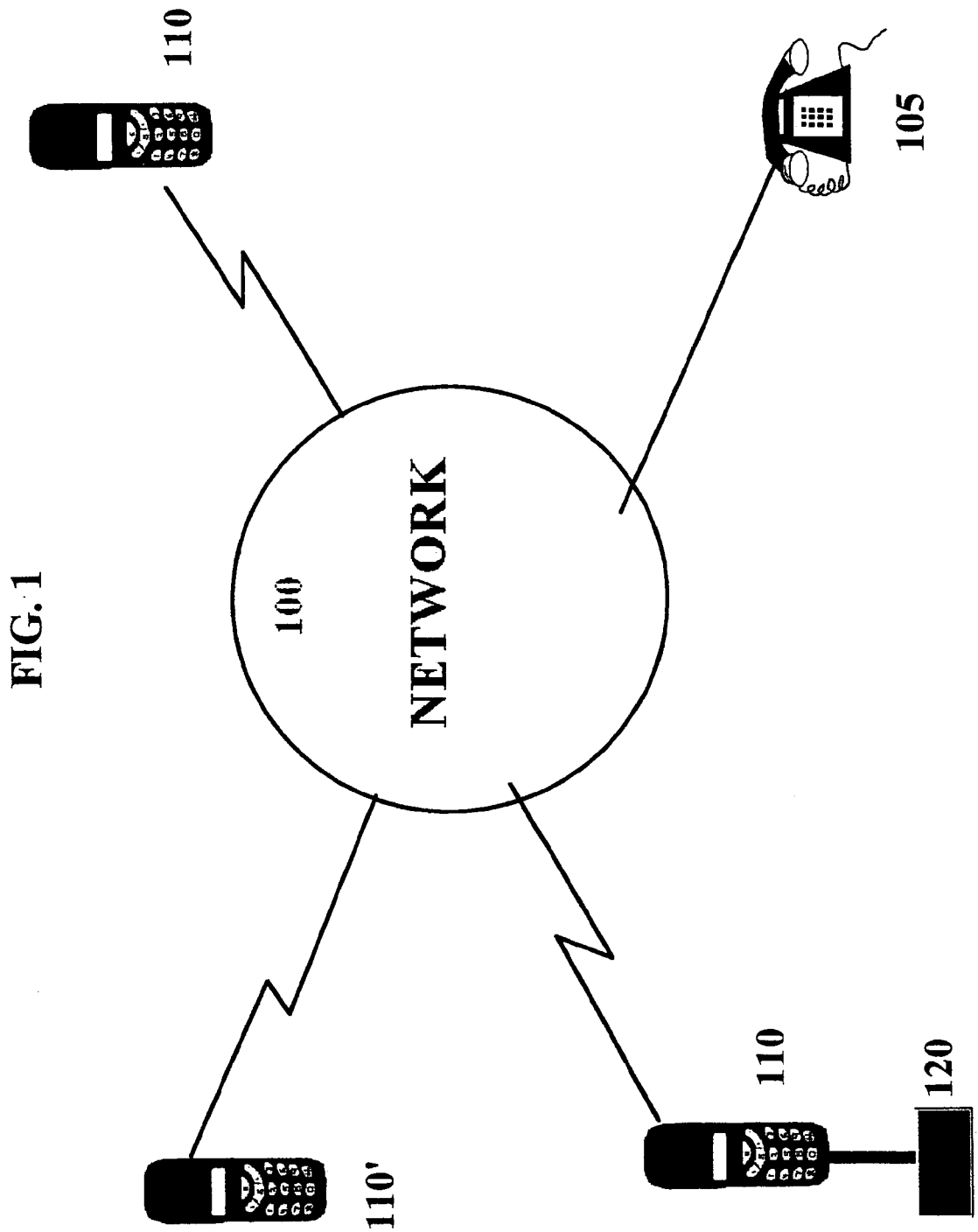
FIG. 1 illustrates a system according to one embodiment of the current invention.

FIG. 1 shows one embodiment of a system incorporating the present invention. In this embodiment, the system includes cell phones 110, cell phones with the Router incorporated into them 110', and cell phones with the Router external attached to them 110–120. It should be noted that although references are made herein to cell phones and user interface devices, these terms are used interchangeably and may include the other user interface devices that utilize cellular telephony services to effectuate communication over network 100. It should be noted that the difference between user interface devices 110' and 110-120 is the cell phones' connection with automatic router 120 which is described in detail below (i.e., 110' and 110–120 denotes that the cellular phone is connected to a Router 120, while 110 has no such Router 120 connected to it).

As shown in FIG. 1, user interface devices or cellular phones 110–120 and 110' communicate via a network 100. Network 100 in one embodiment is a public switched telephone network (PSTN). In an alternate embodiment, network 100 may be the Internet or any network capable of effectuating long distance telephony communications between users. The network enables any one of the interface user devices 110' and/or 110–120 to be in communication with any of the other user interface devices 110',110–120, 110 and/or regular wire telecommunication device 105.

As shown in FIG. 1, some of the interface user devices 110–120 is connected to an automatic router 120 which may be situated outside of the cellular phone 110 and plugged into an access port (i.e., port allowing cellular phone to connect with a external device such as a lap top). As will be described below with reference to FIGS. 2B & 3, the Router 120 enables users having such device to automatically make discount cellular phone calls. It should be noted that while cell phone 110 and automatic Router 120 are shown as one distinct device, router 120 may be a separate devices attached to the cell phone, or otherwise in communication with the cell phone 110 (see FIG. 1, 110–120). Finally, although users seeking to utilize discount long distance services are typically residential or non-commercial users, the scope of the system and method described herein are not limited to such use. Thus, the method and system described herein may include residential cell phone users as well as commercial cell phone users. Finally, it should be noted that the method and system described herein enable users to recognize discounts when placing potential discount calls. Discount calls are defined as international calls.

Automatic Router

Figure 2B:
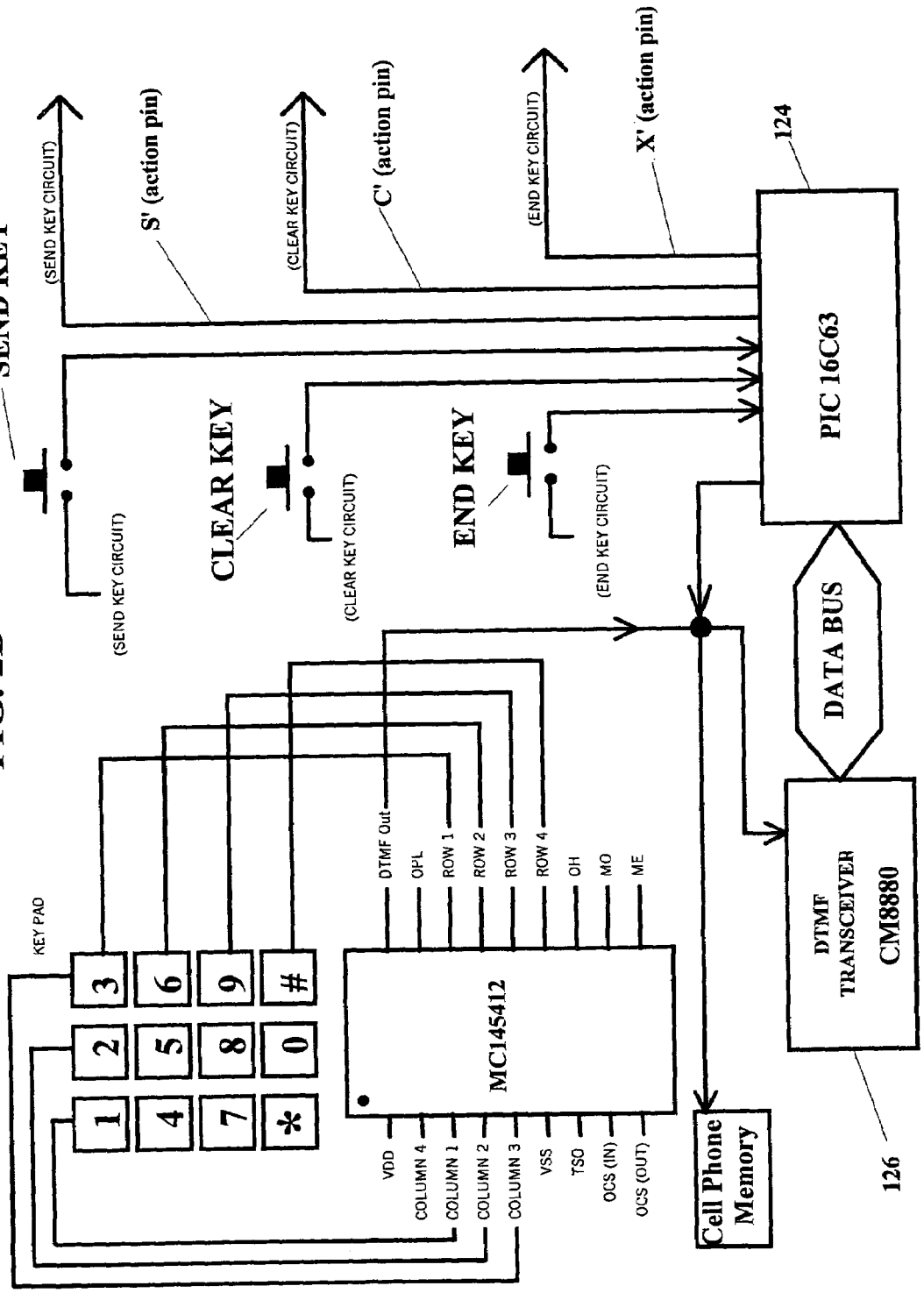
FIG. 2B illustrates one embodiment of the router used in the system shown in FIG. 1 (110'). This illustration shows how the Pic portion of the Router is interposed between the user and the function key circuits of the cell phone.
Figure 3:
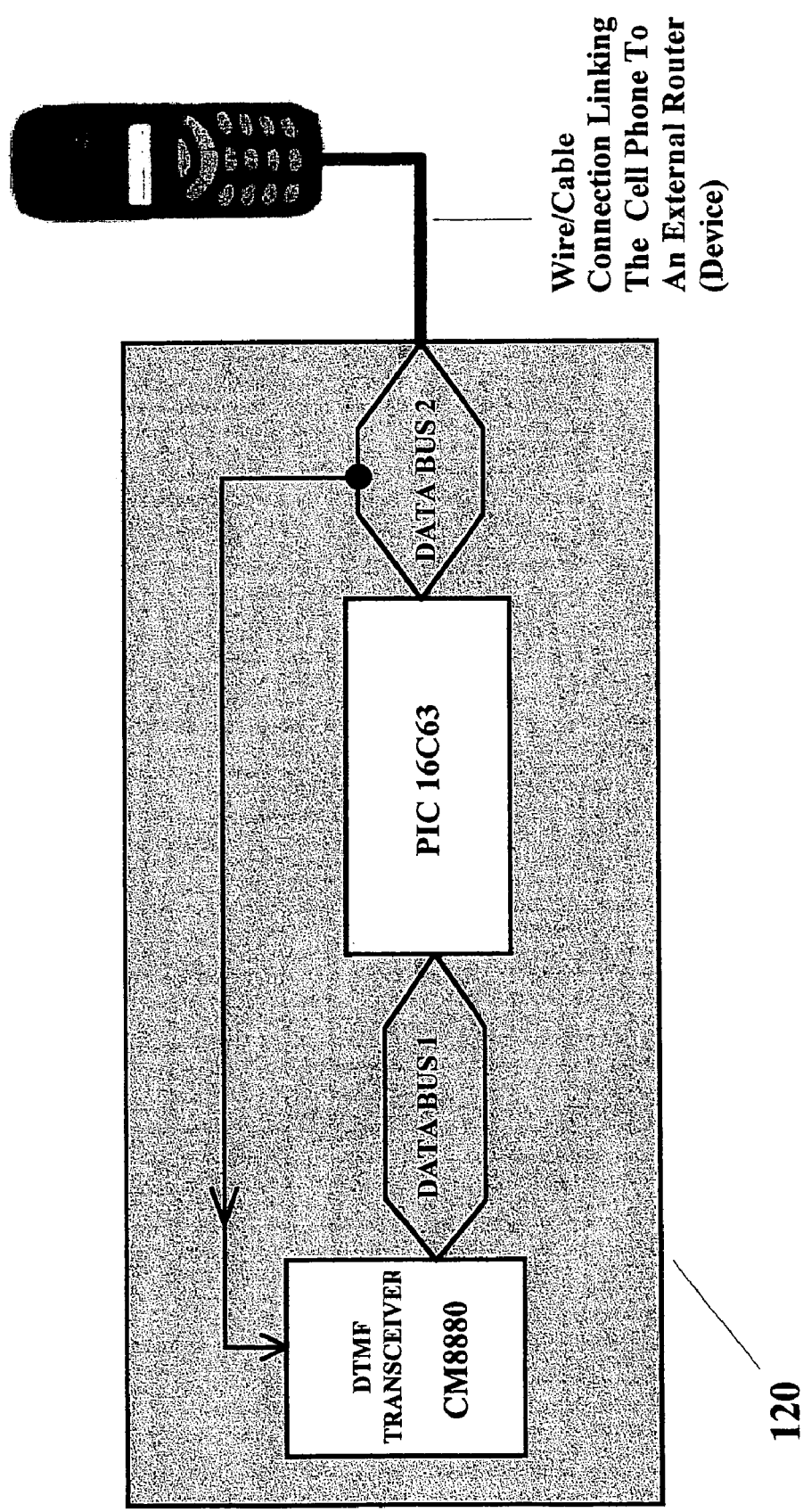
FIG. 3 illustrates an alternate embodiment of the router shown in FIG. 1 (110 & 120). In this illustration the Router is External, but connect to the cell phone by a cable.

FIG. 2B illustrates one embodiment of the router 120 used in the system shown in FIG. 1. The main components of the automatic call router 120 in one embodiment are a Pic 124 (containing a micro-processing unit, EEPROM and RAM memory), DTMF (Dual Tone Multi-Frequency) decoder and encoder chip 126. The automatic call router 120 will be interposed between and in communication with the cell phone control keys or user interface device control keys and the network as shown in FIG. 1. A Router works off of functions common to most if not all cell phones: Clear Function, Send Function, and End Function. The Clear Function is performed whenever the cell phone user presses the Clear Key: when the clear key is pressed, the cell phone removes the last entered digit. The Send Function is performed whenever the cell phone user presses the Send Key: when the Send Key is pressed, the cell phone will dial the phone number stored in memory. The End Function is performed whenever the cell phone user presses the End Key: when the End key is pressed reset itself, the cell phone is turned off, or the cell phone turned is on (see Table 1). The numeric keypad is used to enter the phone number that is to be dialed. Each numeric number entered by the cell phone user is converted into a DTMF signal and stored in both the Router and the cell phone. If the caller enters a wrong digit, the cell phone user can remove the wrong digit by depressing the Clear Key. As the cell phone user enters digits the Router will evaluate the type, quantity, and position of digit(s), to determine if the user is entering an international phone number. If the caller is initiating an international call the Router will set a flag that will cause the call to be routed to a discount long distance service provider.

In the embodiment of FIG. 2B, the Send, End, and Clear Keys normal circuit is interrupted, the signal that would normally be sent to the cell phone circuitry when these Keys are pressed is re-routed to specific Pic I/O pins. The Router polls the I/O pins attached to the Send, Clear, and End function keys on the cell phone to sense the activity of the cell phone user. These polled I/O pins (C.S.X.), act as sensors for the Router, allowing it to determine what the user is attempting to do. The Router also polls the CM8880 chip to determining when it has detected a DTMF signal originating from the cell phone. In this embodiment when the cell phone user presses the Clear Key an electrical signal is sent to a specific Pic I/O pin in the Router. The Router will detect a high/electrical signal on this pin as an indication of the user pressing the Clear Key. This pin is referred to as the "C" (sensing pin), because it effectuates the removal of the last entered digit. The Router uses the Pic's ability to sense a high state on this pin to determine when the cell phone user is trying to remove the last entered digit. The detection of a high/electrical signal on the "C" pin will also remove the last digit entered into Pic's memory too. The Router can place an electrical signal on the Pic pin connected to the cell phone Clear Key circuit, imitating, and causing the cell phone to clears/removes the last digit entered by the user. This Pic I/O pin is referred to as "C'" (action pin).

In this embodiment when the cell phone user presses the Send Key an electrical signal is sent to a specific Pic I/O pin in the Router. The Router will detect a high/electrical signal on this pin as an indication of the user pressing the Send Key. This pin is referred to as the "S" (sensing pin), because it effectuates the dialing of the entered phone number. The Router uses the Pic's ability to sense a high state on this pin to determine when the cell phone user is trying to execute a call. The Router can place an electrical signal on a specific Pic pin connected to the cell phone Send Key circuit, this pin is referred to as the "S'" (action pin). The presence of an electrical signal (high state) on the "S'" pin will cause the cell phone to initiate the process of calling the phone number entered by the cell phone user. In this embodiment when the cell phone user presses the End Key an electrical signal is sent to a specific Pic I/O pin in the Router. The Router will detect a high/electrical signal on this pin as an indication of the user pressing the End Key. This pin is referred to as the "X" (sensing pin), because it effectuates one of three things: resetting the cell phone (exit a cell phone function/procedure), turn the cell phone off, or turn the cell phone on. The detection of a high/electrical signal on the "X" pin will do one of three things depending of the current state of the cell phone: turn the cell phone on if it is off, turn it off if no digits are stored in its memory, or exit/reset the cell phone if user is in the middle of one of a phone procedure. The Router can place an electrical signal on the Pic pin connected to the cell phone Clear Key circuit, imitating, and causing the cell phone to removes all entered digit(s), turn itself off, or turn it self on. This Pic I/O pin is referred to as "X" (X—action pin).

The Pic employed, in one embodiment, is part number Pic 16C63 manufactured by Microchip, DTMF-Transceiver is part number CM8880 manufactured by California Micro Devices, the Keypad transducer chip is part number MC145412 manufactured by Motorola other components and/or configurations may be used for accomplishing such monitoring, capturing of input from the cell phone user, and re-routing international calls.

In FIG. 2 embodiment the MC145412 chip (by Motorola) interfaces with the cell phone keypad, transforming numbers entered by the cell phone user into DTMF signals. The CM8880 monitors the MC145412 DTMF out pin for signal generated from the cell phone user pressing a key on the keypad. Each key on the keypad will generate a specific DTMF signal via the MC145412 chip. When the CM8880 detects a DTMF signal, it will convert the signal into a binary code and notify the Pic by bring one of it I/O pin to a high state. The Pic polling this CM8880 pin will senses the high and attempt to store the value of the DTMF signal in its memory. The CM8880 will bring the DTMF detected I/O pin to a low state once the Pic has stored the value of the number the user entered. The CM8880 will monitor the DTMF out pin of the MC145412 for the next DTMF signal, and start the cycle over again. In another embodiment the CM8880 can be linked to the cell phone audio output of the cell phone, and be able to capturing and decoding DTMF signal from the keypad.

Table 1 is a list of the normal functions associated with the End, Clear, and Send Key. By taking control of these functions, the Router is able to transparently re-route international call to a pre-determined discount service provider.

TABLE 1

| Function Key | Pressed (Y/N) | Cell Phone State | Cell Phone Dial Number/Procedure | Cell Phone Results |
|---|---|---|---|---|
| End Key | Yes | On | None | Phone Turns Itself Off |
| End Key | Yes | Off | None | Phone Activated |
| End Key | Yes | On | Entered Number | Reset Itself |
| Clear Key | Yes | On | Procedure Running | Backs Up On Step |
| Clear Key | Yes | On | Entered Number | Remove Last Entered Digit |
| Send Key | Yes | On | Entered Number | Dial Entered Number |

Automatic Routing Process

The process of automatic router 120 may be segmented into three functions: (1) monitoring the function key of the cell phone (Send, Clear, and End Key), (2) collecting and storing input for the Keypad, (3) determining if a potential discount phone call is being placed; and (4) placing such call at a discounted rate when such rate is available. These processes are described below in detail with reference to FIGS. 3–5 as well as the components illustrated in FIG. 2.

Cell Phone Send, Clear, And End Key Function Monitoring Process

Figure 4:
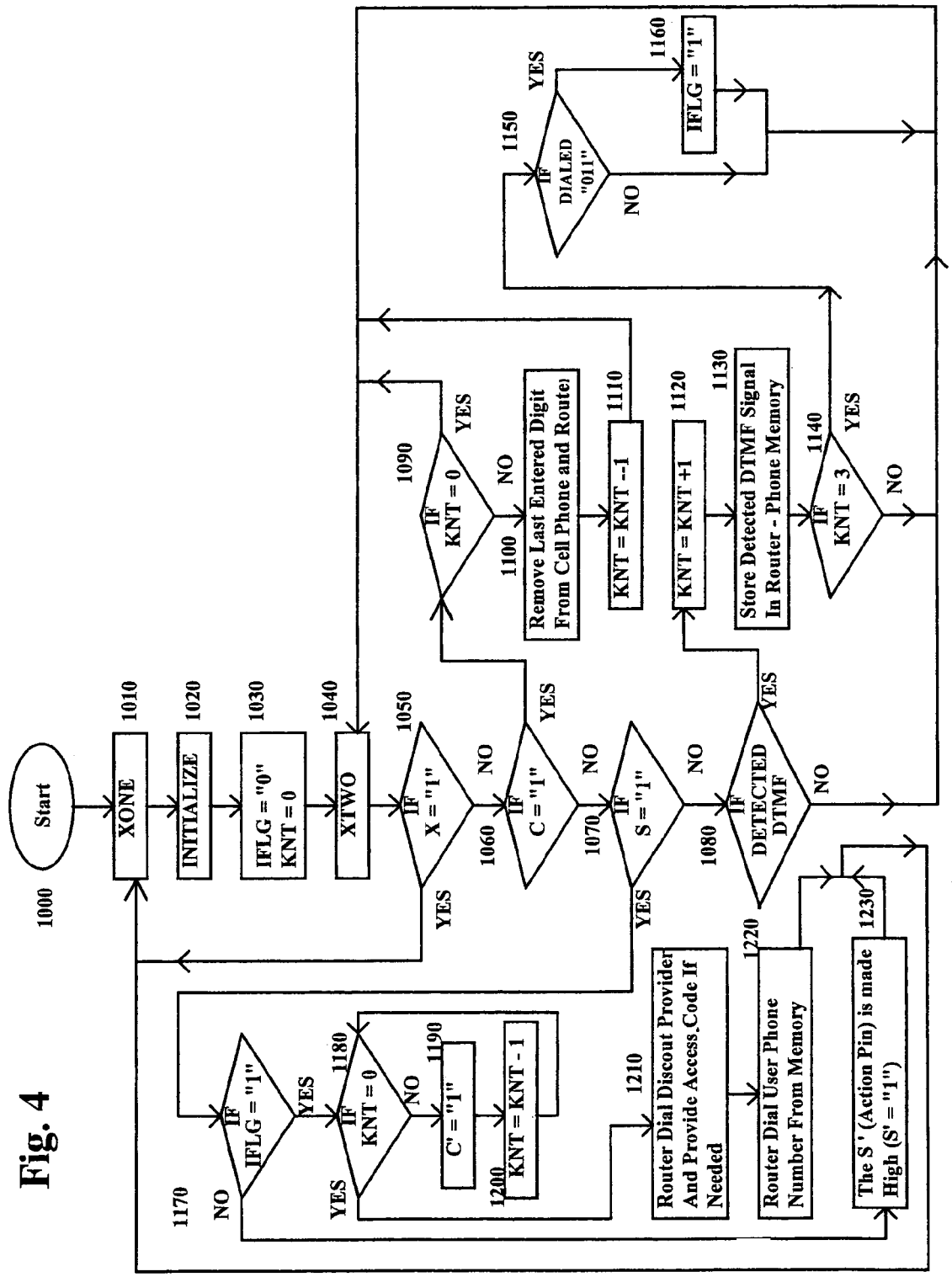
FIG. 4 is a flowchart showing the Router operational procedure.

In this embodiment, the Router is situated between user and the cell phone function keys, allowing it to detect and imitate the user interaction with the cell phone. User input is sent to the Router for storage and evaluation. When the user first turns on the cell phone the Router initialized (Fig i. 4 step 1020). Once initialized the Router will began a process of checking the state of the Pic I/O pins attached to the CM8880, the Send Key, the Clear Key, and the End Key for a high state (FIG. 4, step 1050 to 1070). A high state will appear on the Pic I/O pin whenever the cells phone user presses one of the function keys. When the cell phone user presses End Key, the "X" pin will experience a high state. When the cell phone user presses the Send Key, the "S" pin will experience a high state. When the cell phone user presses the Clear Key, the "C" pin will experience a high state.

Discount International Call Placing Process

In this embodiment (FIG. 2B), the Router programming instructs the Pic to store all captured DTMF decode signals from the CM8880 in memory (FIG. 4, Step 1130). The CM8880 is connected the MC145412 DTMF-Out pin, allowing the CM8880 to capture and transmit the input from the cell phone Keypad to the Pic. In alternate embodiment the CM8880 could capture input from the cell phone Audio Out put circuit: which plays aloud the DTMF tone for the number(s) entered. The Router counts the number of digits entered from the cell phone Keypad and stores them in memory. When the count reaches 3 (FIG. 4, step 1140), the Router will look at the stored digits to determine the nature of the call being made. In this embodiment, if the router 120 determine that a "0" in the first position of the phone number being dialed, and a "1" in the second and third position of the number being dialed, it will assume an international call is being made: "011" (FIG. 4, step 1150). In this embodiment, the absence of a "0" in the first position, places the router 120 in a passive mode, and allows the phone call to occur but not to perform its routing function. The presence of a "0" in the first position of the phone number being dialed triggers the router 120 into performing its specialized function (routing the call) as described more fully below. Other series of numbers may be used to trigger router 120. For example, the router 120 may be configured to trigger all calls beginning with "1011". The Router will not perform its routing function if the dialed phone is just "0", it is programmed to recognize the user attempt to contact an Operator.

The appropriate service provider number and access code may be, in one embodiment, chosen from a plurality of such numbers and codes in accordance with a predetermined protocol. For example, software may enable router 120 to choose a certain provider number and access code when that service provider is the most cost-efficient. In another embodiment, the stored service provider phone numbers and access codes may be utilized on a rotating basis so that the subscribing long distance companies can benefit equally from use the same cell phone user, while the cell phone user continues to recognize savings associated with discounted services.

The process of detecting and routing long distance calls will now be described Referring back to FIG. 4, once an outgoing telephone call is detected in step 1070, the Pic program determines whether the outgoing phone call being placed is an international call. It should be noted that when an "S" pin high condition exists but the call is not an international, the Router will allow the call to goes through without re-routing. This enables normal call to be placed by the cell phone user, making the Router transparent step 1150 and step 1170).

In step 1050, the Pic 124 begins the process of monitoring the "C","S", "X" and DTMF detected pins. The Pic will continue to monitor these pins until it detect a high state on one of them. When the cell phone user starts to enter a telephone number, the DTMF-detected pin will go high (FIG. 4, step 1080), cause the Pin to attempt decoding and store the DTMF signal (FIG. 4, step 1130). The Pic will count each DTMF signal it stores in its RAM memory. The cell phone will also store the user entered digit into its memory too, resulting in the telephone number being stored in two separate locations. When the number of stored digits of the entered phone number equals three (FIG. 4, step 1140), the Pic will evaluate and determine if the call being made in potential discount call (FIG. 4, step 1150 and step 1160). In this embodiment, the potential discount call has an international pre-fix of "011" as the first three digits of the entered phone number (FIG. 4, step 1150). In an alternate embodiment another predetermine combination of digit(s) in another predetermine sequence can be used to indicate an international call: "1011". In this embodiment, when the cell phone user is finished entering the telephone number of a potential discount call, the user will press the "Send Key". When the "Send Key" is press an high state will appear on the "S" pin of the Pic. The Pic will look at the value of the IFLG flag. If the call was determined to be an international call the IFLG flag will have a value of One "1". If the call was determine to be not an international call the IFLG flag will have a value of Zero "0".

International Call Detection And Router Response Process

If an international call has been detected (FIG. 4, step 1160) and the Send Key has been pressed, the Router will place a high on the "C'" pin, sending a signal to the cell phone Clear Key circuit. The Router will use its count of the number of digits entered (FIG. 4, step 1120) to determine how many digits were entered into the cell phone memory. In this embodiment, a high signal on this pin will cause the cell phone to remove the last entered number from its memory. The Router will repeat this process until all of the digits of the entered phone number is removed from the cell phone memory (FIG. 4, step 1180 to step 1200).

In this embodiment, the Router can generate DTMF signals that correspond to the digits of the discount service provider phone number. These signals are passed from a Pic I/O pin to the cell phone memory (FIG. 2B). After the Router has entered the discount provider phone number, it will place a high on the "S'" pin. The "S'" pin is attached to the Send Key circuit, and a high on this pin will cause the circuit to initiate the dialing process of the cell phone. The Router can also provide an access code to the discount provider.

In this embodiment, the Router can also use it ability to generate DTMF signals to load from its memory the phone number that the user had entered. Unlike the cell phone that erased the user entered phone number, the Router keep its copy and used it to generate the DTMF signals needed to produce the phone number user was dialing. After the Router has dialed the user discount call, the Router will re-initialize itself and await the next call.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method for routing calls on a wireless device to a discount telephone service provider, comprising:
    method for collecting the digits of a dialed phone number by monitoring the keypad of a wireless device to detect electrical signals indicating which buttons were pressed;
    method for storing to memory the digits corresponding to the buttons that were pressed on the wireless device keypad;
    method for determining whether an outgoing call from a wireless device is a discount call based on analysis of the leading dialed digits of said call;
    method for performing said analysis at the wireless device;
    method for transparently dialing the phone number for a discount telephone service provider and the digits corresponding to said outgoing long distance call.

2. The method according to claim 1, further comprising:
    method for detecting the electrical signals generated by pressing buttons on a wireless device keypad and determining if the leading digits of a dialed phone number correspond to a predetermined sequence of digits predetermined to be common to a discountable call;
    method for performing said determination, detection, and dialing from an external unit attached to the wireless device.

3. The method according to claim 1, wherein the determining whether a discount call is made is accomplished by software running on a microprocessor located inside of the wireless device that determines whether the leading digits that encode the area code of an outgoing call meets a predetermined sequence of digits.

4. The method according to claim 2, wherein the determining whether a discount call is made is accomplished by determining whether the leading electrical signals generated by dialing a phone number on the wireless device's keypad encodes for the the digits associated with an international call.

5. The method according to claim 2, further comprising:
    method for automatically determining whether an access code is required to effectuate routing a call through a discount service provider; and
    method for automatically providing said access code when said code is required.

6. The method according to claim 1, wherein the discount call is an international call.

7. The method according to claim 1, wherein the discount call is not a special service call, toll free call, or a local call with an area code.

8. The method according to claim 2, further comprising:
    method for transparently providing an access code for a discount service provider by generating electrical signals similar to pressing of keys on a wireless device keypad.

9. A method for routing calls through a discount telephone service using a wireless device, comprising:
    monitoring the activity of a cell phone keypad for detecting outgoing call activity;
    determining whether the outgoing call is a potential discount call;
    determining whether the outgoing call is a potential discount call by detecting a predetermined sequence of digits in a predetermined position of the dialed phone number of the outgoing call;

collecting the digits corresponding to the discount call; and dialing the phone number for accessing a discount telephone service provider and the digits corresponding to the discount call.

10. The method according to claim 9, further comprising:

effectuating a re-set state after the initial phone number is entered but not sent out over the communication network;

dialing the phone number of the discount service provider; and dialing the digits of the detected outgoing discountable phone number.

11. The method according to claim 9, further comprising:

method for determining whether an access code is required to effectuate said routing; and transmitting said access code through a wireless device when said code is required by generating electrical signals similar to the pressing of keypad buttons corresponding to the digits of the needed code.

12. The method according to claim 9, wherein the potential discount call is an international call.

13. A system for automatically routing calls through a discount telephone service using a wireless device, comprising:

a means for determining whether an outgoing call on a wireless device is a potential discount call;

a means for collecting the digits corresponding to the outgoing call by monitoring the wireless device keypad for activity; and a means for dialing the access number for a discount telephone service provider and the digits corresponding to the outgoing call by generating electrical signals that correspond to the buttons on the keypad in a manner that produces the phone number of the outgoing call and the discount service provider.

14. The system according to claim 13, further comprising:

means for determining whether the leading detected dialed digits match a predetermined number of DTMF tones in a predetermined sequence that corresponding to a potential discountable call.

15. The system according to claim 14, wherein the means for determining whether a discount call is being made is accomplished by detecting the dialed digits as electrical signals from the keypad of the wireless device and determining whether they meet a predetermined sequence of digits.

16. The system according to claim 14, wherein the means for determining whether a discount call is being made is accomplished by determining if the first dialed digits are associated with a predetermined sequence of digits of an international phone number.

17. The system according to claim 14, further comprising:

means for determining whether an access code is required to effectuate said routing; and means for providing said access code to the discount service provider when said access code is required.

18. The system according to claim 13, wherein the potential discount call is an international call.

19. The system according to claim 14, wherein it is determined by the leading dialed digits whether the potential discount call is not a special service call or toll free call.

20. The system according to claim 14, further comprising:

means for selecting a discount service provider phone number and the required access code from a plurality of service provider and their access code; and means for dialing the selected discount service provider and any required access code by generating electrical signals similar to the pressing of keypad buttons corresponding to the digits of the discount service provider phone number, the dialed phone number, and the access code if required.

21. A system for routing calls through a discount telephone service, comprising:

means for monitoring a cell phone function keys for outgoing call activity;

means for determining what digits are dialed on a cell phone keypad in the making of an outgoing call;

means for determining whether the outgoing call is a potential discount call;

means for determining whether a predetermined number of the leading dialed digits of said outgoing call are of a known sequence of digits associated with a discountable call; and means for routing the outgoing call to a discount service provider by re-setting the phone before dialing the access number for a discount telephone service provider and the digits corresponding to the said outgoing call.

22. The system according to claim 21, further comprising:

means for determining whether an access code is required to effectuate said routing; and means for transmitting said access code through the cell phone when said code is required.

23. The system according to claim 21, wherein the potential discount call is an international call.

24. The system according to claim 21, wherein the potential discount call is not a special call or a toll free call.

25. A system for routing calls through a discount telephone service using a wireless device, comprising:

a processor configured for identifying electrical signals encoding digits associated with an outgoing telephone number by monitoring activity on the wireless device keypad and storing observed activity in memory;

a processor configured for analyzing one or more of the electrical signals encoding the digits generated by pressing a key on the wireless device keypad, and configured for determining whether a potential discount call is being made;

memory configured for collecting and storing the dialed telephone number; and a processor configured for generating electrical signals corresponding to the phone number for a discount service provider, an access code if needed, and the outgoing dialed telephone number.

26. The system according to claim 25, wherein the processor is further configured for comparing a predetermined number of digits of an outgoing call in order to determine whether the outgoing telephone number is a discount call.

27. The system according to claim 26, wherein the leading digits of an outgoing call are represented as electrical signals that encodes for the digits that indicate the call is international or long distance.

28. The system according to claim 25, wherein the leading electrical signals of an outgoing call represent the digits that encode an area code of a long distance phone number.

29. The system according to claim 26, wherein the processor is further configured for determining whether an international phone call is being made prior to the action of a wireless device user convey the dialed phone number to the communication network.

30. The system according to claim 26, wherein the processor is further configured for determining whether an access code is required to effectuate said routing, and for transmitting said access code stored in memory over the wireless device when said code is required.

31. The system according to claim 25, wherein the potential discount call is an international call.

32. The system according to claim 25, wherein the potential discount call is not a special type call or toll free call.

33. The system according to claim 26, wherein a processor is located in an router located externally to but in communication with a wireless device is further configured for choosing an access number from a plurality of access numbers for a discount service provider, and for dialing the selected access number associated with the a discount service provider, said dialing is effectuated by generating electrical signals that corresponds to the pressing buttons on a wireless device keypad.

34. A system for routing calls through a discount telephone service, comprising:
    an array of Pic I/O pins configured for monitoring a cell phone activity for outgoing call, said array comprising of at least one Pic I/O pin;
    a DTMF encoder configured for detecting the DTMF tones associated with an outgoing telephone number, a processor configured for determining whether the outgoing call is a discount call by determining whether the predetermined number of dialed digits comprises a predetermined sequence of one or more DTMF tones that is are dialed by a user; a memory configured for storing the telephone number corresponding to the discount call; and a DTMF generator configured for dialing the phone number for a discount service provider and the outgoing telephone number.

35. The system according to claim 34, wherein the processor is further configured for determining whether an access code is required to effectuate said routing, and for transmitting said access code over the cell phone when said code is required by generating electrical signals that encode the digits of said access code.

36. The system according to claim 34, wherein the potential discount call is an international call.

37. The system according to claim 34, wherein the potential discount call is not a special type call or a toll free call.

38. The system according to claim 21, wherein a system for routing call to a discount service provider is integrated into a wireless device.

39. The system according to claim 34, wherein a system for routing call to a discount service provider is attaches to a wireless device.

40. Located within a wireless device, computer executable software code stored on a computer readable medium, the code for routing calls through a discount telephone service using said wireless device, comprising:
    code for determining whether an outgoing call on a wireless device is a discount call;
    code for collecting the digits corresponding to the discount call by monitoring the keypad of a wireless device for activity;
    code for dialing the number for a discount telephone service provider and the digits corresponding to the discount call by having a processor capable of storing the dialed phone number in memory and being able to generate electrical signals that matches both of the discount service provider phone numbers and the outgoing call phone number; and
    code for providing an access code if needed.

41. A computer readable medium having computer executable software code stored thereon, the code for automatically routing calls through a discount telephone service using a wireless device, comprising:
    code for automatically determining whether an outgoing call on a wireless device is a discount call;
    code for collecting the digits corresponding to the discount call by monitoring the keypad of a wireless device for activity; and
    code for dialing the access number for a discount telephone service provider and the digits corresponding to the discount call.

42. A programmed computer for routing calls through a discount telephone service using a wireless device, comprising:
    a memory in a wireless device having at least one region for storing computer executable program code; and
    a processor for executing the program code store in said memory, wherein the program code includes:
    code for determining from the sequence of the leading digits whether an outgoing call is a discount call;
    code for collecting the digits corresponding to the discount call by monitoring the activity of the keypad of the wireless device; and
    code for dialing the access number for a discount telephone service provider and the digits corresponding to the discount call by generating the electronic signals that correspond to digits dialed on a wireless device keypad.

43. Computer executable software code stored on a computer readable medium located in a wireless device, the code for routing calls through a discount telephone service, comprising:
    code for monitoring the activity of a cell phone keypad for outgoing call activity;
    code for determining whether the outgoing call is a potential discount call;
    code for detecting the DTMF tones corresponding to a predetermined number of DTMF tones, wherein the determining whether the outgoing call is a potential discount call is accomplished by determining whether one or more of a predetermined number of DTMF tone meets a predetermined sequence of the DTMF tones;
    code for collecting the digits corresponding to the discount call; and
    code for dialing the number for a discount phone service provider and the digits corresponding to the discount call.

44. A computer readable medium having computer executable software code stored thereon, the
    code for routing calls through a discount telephone service, comprising:
    code for monitoring the activity of a cell phone keypad to determine whether an outgoing call is being made;
    code for determining whether the outgoing call is a potential discount call by determining whether the outgoing call contains a predetermined number of DTMF tones in a predetermined sequence;
    code for collecting the digits corresponding to the discount call;
    code for determining whether all of the numbers associated with the discount call have been collected within a predetermined polling period; and
    code for dialing the access number for a discount telephone service provider and the digits corresponding to the discount call.

45. A programmed computer for routing calls through a discount telephone service, comprising:

- a memory in a wireless device having at least one region for storing computer executable program code; and
- a processor in a wireless device for executing the program code stored in memory, wherein the program code includes: code for monitoring a wireless device phone activity for outgoing call;
- code for determining whether the outgoing call is a potential discount call;
- code for detecting the DTMF tones corresponding to a predetermined number of DTMF tones, wherein the determining whether the outgoing call is a potential discount call is accomplished by determining whether at least one or more DTMF tones meets a predetermined sequence of the DTMF tones;
- code for collecting the digits corresponding to the discount call; and
- code for dialing the access number for a discount telephone service provider and the digits corresponding to the discount call.

\* \* \* \* \*